United States Patent [19]
Griffith

[11] 4,419,778
[45] Dec. 13, 1983

[54] FURNITURE SUSPENSION SYSTEM

[75] Inventor: Harold Griffith, R.R. #4, Springdale, Ark. 72764

[73] Assignee: Harold Griffith, Springdale, Ark.

[21] Appl. No.: 291,172

[22] Filed: Aug. 10, 1981

[51] Int. Cl.³ .............................................. A47C 23/08
[52] U.S. Cl. .................................... 5/244; 248/618
[58] Field of Search ................ 5/186 R, 186 B, 239, 5/241, 242, 244, 245, 243; 248/560, 581, 617–620, 624

[56] References Cited

U.S. PATENT DOCUMENTS

| | | | |
|---|---|---|---|
| 242,980 | 6/1881 | Richter | 248/619 |
| 666,802 | 1/1901 | Ford | 248/624 |
| 1,341,714 | 6/1920 | Hower | 5/243 |
| 1,753,047 | 4/1930 | Fromm | 248/581 |
| 1,979,892 | 11/1934 | Loeffler | 248/581 |
| 2,004,549 | 6/1935 | Boyd | 5/186 B |
| 2,073,693 | 3/1937 | Hanauer | 5/59 R |
| 2,218,333 | 10/1940 | Frisk | 248/581 |
| 2,377,464 | 6/1945 | Tucker | 5/244 |

Primary Examiner—Ramon S. Britts
Assistant Examiner—Michael F. Trettel
Attorney, Agent, or Firm—Boyd D. Cox

[57] ABSTRACT

A suspension system for furniture and furniture incorporating such system whereby forces applied to the furniture are effectively dissipated or cushioned to afford comfortable conditions for a user of the furniture.

12 Claims, 2 Drawing Figures

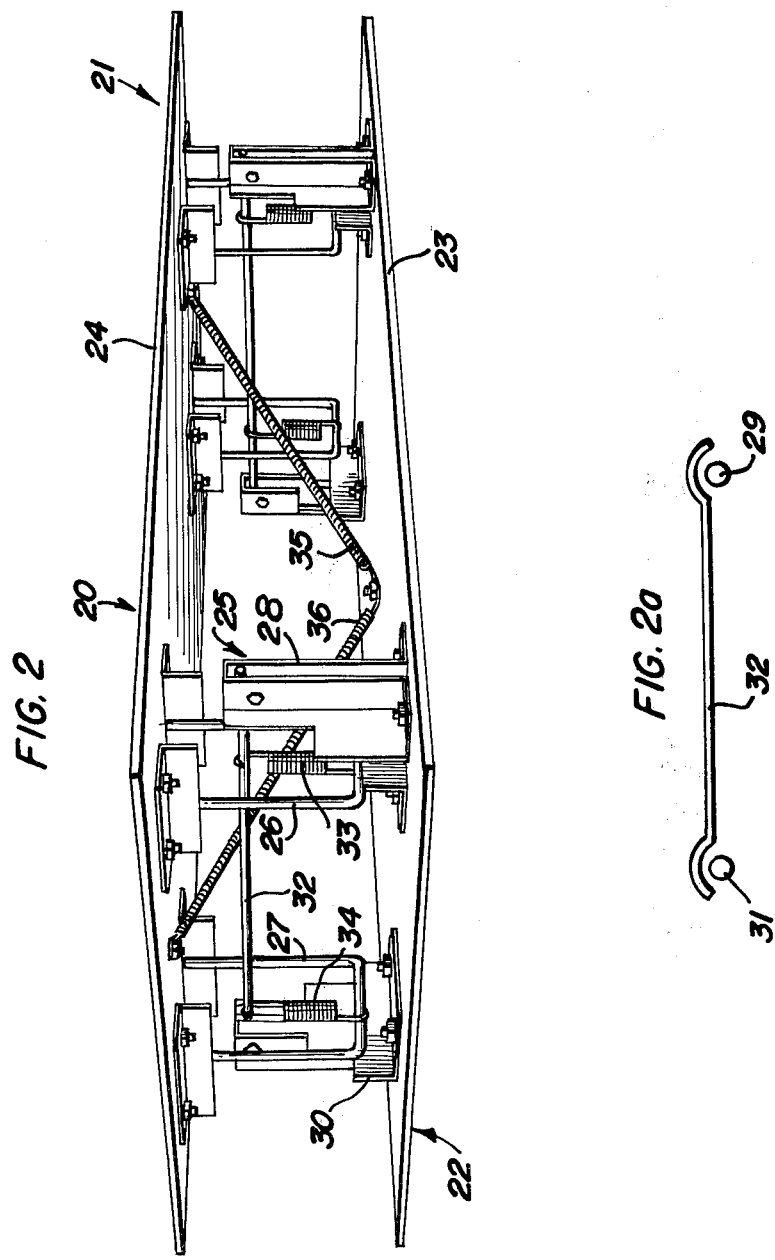

FURNITURE SUSPENSION SYSTEM

BACKGROUND OF THE INVENTION

The present invention relates to a suspension system and more particularly relates to a suspension system for furniture. The present invention also relates to furniture and more particularly relates to furniture used in vehicles or other places where it is desirable to dissipate or cushion forces applied to the furniture.

Numerous attempts have been made to provide means for dissipating or cushioning forces applied to furniture, especially when the furniture is utilized in vehicles of various types. One example of such an attempt may be found in U.S. Pat. No. 3,612,599 to Sternberg which provides for a bunk assembly for highway vehicles such as large tractor-trailer vehicles. Another example of such an attempt is found in U.S. Pat. No. 2,845,111 to Barechi et al whereby a vehicle chair especially for intracity transit type buses is provided.

Prior art furniture construction of this type generally suffers from one or more of the following problems: (1) complex, costly design, (2) difficult manufacture and installation and (3) severe rigidity such that forces applied to the furniture are not adequately dissipated.

SUMMARY OF THE INVENTION

The present invention provides for a suspension system for furniture which is capable of effectively dissipating forces applied to the furniture. The present invention also provides for furniture incorporating such suspension system.

The furniture may be of any type, although it most typically takes the form of a seat or bed. The furniture may be used in any application where comfort is sought, however, it is particularly useful in a vehicular application. When a vehicle (either ground, sea or air) encounters such things as uneven road surfaces, rough water, or turbulent air, the forces created thereby can result in uncomfortable conditions for a user of furniture within the vehicle. The suspension system of this invention effectively dissipates such forces making available extremely comfortable furniture for such application.

The suspension system of the present invention may take the form of a double-U configuration or a rod and U configuration. In a preferred construction of a bed, the bed comprises a base and a top platform, such base and platform being attached by four double-U configurations. At each corner of the bed is a U-shaped member fixedly attached to the top side of the base and at an approximately ninety degree (90°) angle another U-shaped member is fixedly attached to the underside of the platform such that the approximate center points of the horizontal segments of the U-shaped members are substantially aligned on a vertical axis. A suspension spring connects the two U-shaped members approximately along such vertical axis. Such assembly allows for up and down movement of the top platform, as well as simultaneous horizontal movement within a three hundred and sixty degree (360°) arc, allowing for forces applied to the bed to be effectively dissipated and resulting in an extremely comfortable bed for the user.

In another preferred construction of a bed, the bed comprises a base and a top platform, such base and platform being attached by two rod and U configurations, one such configuration at the head of the bed, the other at the foot. Each rod and U configuration incorporates two bearing holders which are fixedly attached to the top side of the base at a respective head or foot corner thereof. These bearing holders each have a bearing near the top thereof. A suspension rod rests upon such bearings and moves laterally thereon. Each rod and U configuration also incorporates two U-shaped members fixedly attached to the bottom side of the top platform at a respective head or foot corner thereof corresponding to a corner of attachment of a bearing holder, such U-shaped members being attached slightly interior the bearing holders and in a manner such that the suspension rod passes through the open spaces formed by the U-shaped members. An approximately vertically mounted suspension spring connects each U-shaped member to the suspension rod. This assembly also allows for up and down movement of the top platform, as well as simultaneous horizontal movement within a three hundred and sixty degree (360°) arc, likewise allowing for forces applied to the bed to be effectively dissipated and resulting in an extremely comfortable bed for the user.

A principal object of the present invention therefore is the provision of a suspension system for furniture which effectively dissipates forces applied to the furniture and thereby affords extremely comfortable furniture for the user thereof.

Another object of the present invention is the provision of furniture incorporating such suspension system.

Another object of the present invention is the provision of furniture incorporating such suspension system which is of simple, compact construction.

Still another object of the present invention is the provision of furniture incorporating such suspension system which is easy to manufacture and install.

Other objects and advantages of this invention will become apparent from a consideration of the following detailed description thereof made with reference to the accompanying drawings which form a part of this specification.

BRIEF DESCRIPTION OF THE DRAWINGS

FIG. 2 is a perspective view of an improved bed incorporating the rod and U configuration furniture suspension system of the present invention.

FIG. 2a is a schematic side view of a suspension rod resting upon bearing members of the rod and U configuration furniture suspension system of the present invention.

DETAILED DESCRIPTION

Figure 1:
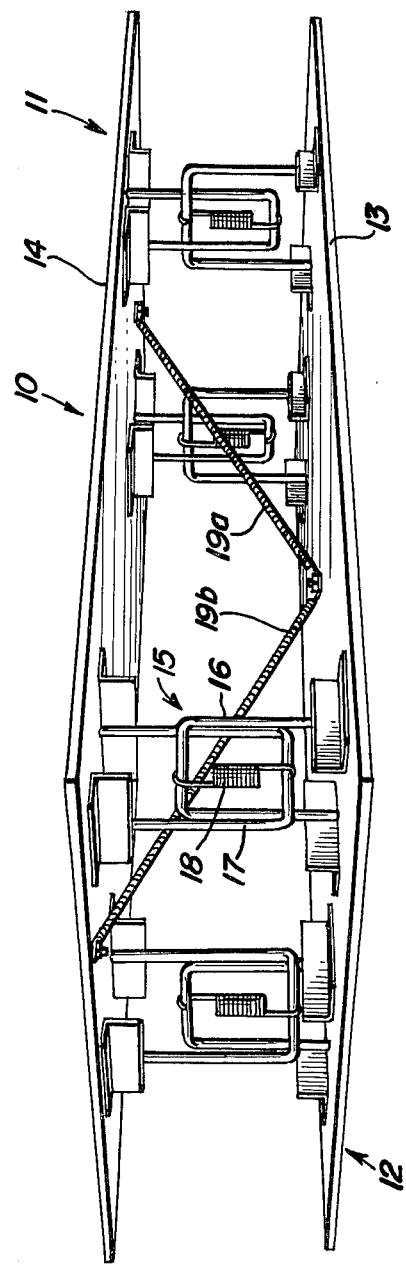
FIG. 1 is a perspective view of an improved bed incorporating the double-U configuration furniture suspension system of the present invention.

An improved bed 10 embodying the present invention with the double-U configuration furniture suspension system is illustrated in FIG. 1. The bed 10, having a head end 11 and a foot end 12, comprises a generally rectangular base 13 and a generally rectangular top platform 14. The base 13 and platform 14 are attached near each corresponding corner by a suspension system 15. The suspension system 15 has a first generally U-shaped member 16, a second generally U-shaped member 17 and a suspension spring 18. The first generally U-shaped member 15 has the ends thereof fixedly attached to the upperside of the base 13 and the second generally U-shaped member 17 has the ends thereof fixedly attached to the underside of the platform 14 such that the ends of the first generally U-shaped member 16 are spaced approximately equally from the ends of the second generally U-shaped member 17. In this manner, the center points of the U-shaped members 16 and 17 are approximately aligned on an axis generally perpendicular to both the base 13 and the platform 14. The suspension spring 18 has one end attached to the first generally U-shaped member 16 proximate the center point thereof and has the other end attached to the second generally U-shaped member 17 proximate the center point thereof.

Also shown in FIG. 1 are a first stabilizer spring 19a and a second stabilizer spring 19b, which are optional components of the bed 10. The first stabilizer spring 19a has one end attached to the upperside of the base 13 proximate the center section thereof and has the other end attached to the underside of the platform 14 proximate the central head end section thereof. The second stabilizer spring 19b has one end attached to the upperside of the base 13 proximate the center section thereof and has the other end attached to the underside of the platform 14 proximate the central foot end section thereof.

It is noted that although in this embodiment four suspension systems 15 are shown and these are located proximate the corners of the bed 10, such structure is merely preferred and the number of systems could vary both upwards and downwards and the sites of attachment could likewise vary depending upon the needs of a particular application. Similarly, the prescribed relative placements of the generally U-shaped members 16 and 17, suspension spring 18, and stabilizer springs 19a and 19b are not essential but merely preferred.

An improved bed 20 embodying the present invention with the rod and U configuration furniture suspension system is illustrated in FIGS. 2 and 2a. The bed 20 having a head end 21 and a foot end 22 comprises a generally rectangular base 23 and a generally rectangular top platform 24. The base 23 and platform 24 are attached near the corresponding head and foot ends thereof by a suspension system 25. The suspension system 25 has a first generally U-shaped member 26, a second generally U-shaped member 27, a first bearing holder 28 with a first bearing 29 (see FIG. 2a) near the top thereof, a second bearing holder 30 with a second bearing 31 (see FIG. 2a) near the top thereof, a suspension rod 32, a first suspension spring 33 and a second suspension spring 34. The first and second bearings 29 and 31 rotate around axes generally directed from the head end 21 of the bed to the foot end 22 of the bed 10.

The first generally U-shaped member 26 has the ends thereof fixedly attached to the underside of the platform 24 near an end corner thereof with such ends of such first generally U-shaped member 26 being generally aligned in the direction from the head end 21 of the bed 10 to the foot end 22 of the bed 10. The second generally U-shaped member 27 has the ends thereof fixedly attached to the underside of the platform 24 near the other corresponding end corner thereof with such ends of such second generally U-shaped member 27 being generally aligned in the direction from the head end 21 of the bed 10 to the foot end 22 of the bed 10. The first bearing holder 28 is fixedly attached to the upperside of the base 23 near the end corner thereof opposite the platform end corner of attachment of the first generally U-shaped member 26. The second bearing holder 30 is fixedly attached to the upperside of the base 23 near the corner thereof opposite the platform end corner of attachment of the second generally U-shaped member 27.

The suspension rod 32 has one end section thereof mounted movably on the first bearing 29 of the first bearing holder 28 in the direction of rotation of such first bearing 29 and the other end section thereof mounted movably on the second bearing 31 of the second bearing holder 30 in the direction of rotation of such second bearing 31. As illustrated in FIG. 2b, the ends of suspension rod 32 are preferably curved in an arched fashion to facilitate stable movement upon the first and second bearings 29 and 31. The suspension rod 32 passes through the open space defined by the first generally U-shaped member 26 and through the open space defined by the second generally U-shaped member 27. The first spring 33 has one end attached to the first generally U-shaped member 26 proximate the center point thereof and has the other end attached to the suspension rod 32 at a point approximately directly above such center point. The second spring 34 has one end attached to the second generally U-shaped member 27 proximate the center point thereof and has the other end attached to the suspension rod 32 at a point approximately directly above such center point.

Also shown in FIG. 2 are a first stabilizer spring 35 and a second stabilizer spring 36 which are optional components of the bed 20. The first stabilizer spring 35 has one end attached to the upperside of the base 23 proximate the center section thereof and has the other end attached to the underside of the platform 24 proximate the central head end section thereof. The second stabilizer spring 36 has one end attached to the upperside of the base 23 proximate the center section thereof and has the other end attached to the underside of the platform 24 proximate the central foot end section thereof.

As with the bed of FIG. 1, it is noted that although in this particular embodiment two suspension systems 25 are shown and these are located proximate the head and foot ends of the bed 20, such structure is merely preferred and the number of systems could very both upward and downward and the sides of attachment could likewise vary depending upon the needs of a particular application. Similarly, prescribed relative placements of the first and second generally U-shaped members 26 and 27, the first and second bearing holders 28 and 30, the first and second bearings 29 and 31, the suspension rod 32, the first and second suspension springs 33 and 34, and the first and second stabilizer springs 35 and 36 are not essential but merely preferred.

When utilized in a particular environment, the bed 10 or the bed 20 of the preferred embodiments of the present invention will dissipate forces as they are applied to the bed 10 or the bed 20. This is accomplished by the platform 14 or 24 being allowed free simultaneous vertical and horizontal movement by the suspension systems 15 or 25.

In some applications, it may be desirable to hold this free movement in check to a certain degree and for such purpose the stabilizer springs 19a and 19b or 35 and 36 are provided. Another means of restricting such movement is by replacing some or all of the suspension springs 18 or 33 and 34 with appropriately sized rod segments or links of chain. One circumstance when such rod segments or links of chain may be used is when it is desired for one end of a bed not to move as much as the other end, for instance the foot end not to move as much as the head end. In such case, the suspension springs 18 or 33 and 34 of the foot end would be replaced with such rod segments or links of chain.

In some applications, it may be desirable to facilitate the movement of the platform 14 o 24 particularly in the vertical direction. In such cases, with the preferred embodiment of FIG. 1, cut-outs may be provided in the base 13 and in the platform 14 immediately below and above the suspension springs 18 such that the first and second generally U-shaped members 16 and 17 are allowed a greater range of vertical motion. With the preferred embodiment of FIG. 2, cut-outs may be provided in the base 23 immediately below the suspension springs 33 and 34 such that the first and second generally U-shaped members 26 and 27 are allowed a greater range of vertical motion.

Although not shown in the drawings, it is noted that if desired, the double-U configuration suspension system may be used in combination with the rod and U configuration suspension system. For instance, the former could be used at the head end of a bed and the latter at the foot end.

In addition, materials of construction of the various components of the bed 10 or 20 may be of any suitable type, such as metal, wood or plastic of sufficient strength to withstand the forces applied to the bed 10 or 20 and may be selected for particular applications on the basis of such things as weight, wear characteristics and availability.

It is also noted that although the preceding descriptions of preferred embodiments specifically refer to beds, the suspension systems described herein are similarly applicable to other types of furniture and although vehicular applications have been specifically discussed herein, the suspension systems and furniture of the present invention are not limited to such type applications and may be utilized in many different environments, even a home environment, where more comfortable circumstances can be afforded the user.

It is understood that the present invention is not limited to that precisely as described hereinabove. Many modifications and variations of this invention will be apparent to those skilled in the art. It is, therefore, intended that the scope of the invention be solely limited by the claims appended hereto.

I claim:

1. A suspension system for furniture comprising a base, a first generally U-shaped member, a second generally U-shaped member and a suspension spring, the first generally U-shaped member having the ends thereof fixedly attached to the base with the second generaly U-shaped member having the ends thereof fixedly attached to the furniture such that a portion of said first generally U-shaped member passes through the space bordered by said second generally U-shaped member and a portion of said second generally U-shaped member passes through the space bordered by said first generally U-shaped member and such that a portion of said first generally U-shaped member is directly above a portion of said second generally U-shaped member, said suspension spring having one end attached to the first generally U-shaped member proximate the portion thereof directly above said second generally U-shaped member and having the other end attached to the second generally U-shaped member proximate the portion thereof directly below said first generally U-shaped member.

2. A suspension system for furniture comprising a base, a first generally U-shaped member, a second generally U-shaped member, a first bearing holder, a second bearing holder, a first bearing held by said first bearing holder, a second bearing held by said second bearing holder, a suspension rod, a first suspension spring and a second suspension spring, said first generally U-shaped member having the ends thereof fixedly attached to the furniture, said second generally U-shaped member having the ends thereof fixedly attached to the furniture such that said second generally U-shaped member is positioned with the open space defined by such generally U-shaped member substantially aligned with the open space defined by the first generally U-shaped member, said first bearing holder being fixedly attached to said base, said second bearing holder being fixedly attached to said base, said second bearing holder being fixedly attached to said base such that said first bearing is substantially aligned with said second bearing, said suspension rod having one section thereof mounted movably in the general direction of alignment of the open spaces of said generally U-shaped members on said first bearing and having another section thereof mounted movably in the general direction of alignment of the open spaces of said generally U-shaped members on said second bearing with said rod passing through the open space defined by the first generally U-shaped member and through the open space defined by the second generally U-shaped member, said first suspension spring having one end attached to the first generally U-shaped member and having the other end attached to the suspension rod at a point approximately directly above the point of attachment of such spring with the first generally U-shaped member, and said second suspension spring having one end attached to the second generally U-shaped member and having the other end attached to the suspension rod at a point approximately directly above the point of attachment of such spring with the second generally U-shaped member.

3. An improved bed comprising a base having an upperside and underside, a top platform having an upperside and underside, said base and said platform being attached by at least one suspension system having a first generally U-shaped member, a second generally U-shaped member and a suspension spring, the first generally U-shaped member having the ends thereof fixedly attached to the upperside of the base with the second generally U-shaped member having the ends thereof fixedly attached to the underside of the platform such that a portion of said first generally U-shaped member passes through the space bordered by said second generally U-shaped member and a portion of said second generally U-shaped memeber passes through the space bordered by said first generally U-shaped member and such that a portion of said first generally U-shaped member is directly above a portion of said second generally U-shaped member, said suspension spring having one end attached to the first generally U-shaped member proximate the portion thereof directly above said second generally U-shaped member and having the other end attached to the second generally U-shaped member proximate the portion thereof directly below said first generally U-shaped member.

4. An improved bed comprising a base having an upperside and underside, a top platform having an upperside and underside, said base and said platform being attached by at least one suspension system having a first generally U-shaped member, a second generally U-shaped mamber, a first bearing holder, a second bearing holder, a first bearing held by said first bearing holder, a second bearing held by said second bearing holder, a suspension rod, a first suspension spring and a second suspension spring, said first generally U-shaped member having the ends thereof fixedly attached to the underside of said platform, said second generally U-shaped member having the ends thereof fixedly attached to the underside of said platform such that said second generally U-shaped member is positioned with open space defined by such generally U-shaped member substantially aligned with the open space defined by the first generally U-shaped member, said first bearing holder being fixedly attached to said base, said second bearing holder being fixedly attached to said base such that said first bearing is substantially aligned with said second bearing, said suspension rod having one section thereof mounted movably in the general direction of alignment of the open spaces of said generally U-shaped members on said first bearing and having another section thereof mounted movably in the general direction of alignment of the open spaces of said generally U-shaped members on said second bearing with the section of said rod between the rod sections mounted on said first and second bearings passing through the open space defined by the first generally U-shaped member and through the open space defined by the second generally U-shaped member, said first suspension spring having one end attached to the first generally U-shaped member and having the other end attached to the suspension rod at a point approximately directly above the point of attachment of such spring with the first generally U-shaped member, and said second suspension spring having one end attached to the second generally U-shaped member and having the other end attached to the suspension rod at a point approximately directly above the point of attachment of such spring with the second generally U-shaped member.

5. An improved bed having a head end and foot end comprising a generally rectangular base with an upperside, underside, head end and foot end, a generally rectangular top platform with an upperside, underside, head end and foot end, said base and said platform being attached near each corresponding corner thereof by a suspension system having a first generally U-shaped member, a second generally U-shaped member and a suspension spring, the first generally U-shaped member having the ends thereof fixedly attached to the upperside of the base with the second generally U-shaped member having the ends thereof fixedly attached to the underside of the platform such that a portion of said first generally U-shaped member passes through the space bordered by said second generally U-shaped member and a portion of said second generally U-shaped member passes through the space bordered by said first generally U-shaped member and such that the ends of the first generally U-shaped member are spaced approximately equally from the ends of the second generally U-shaped member and the center points of the U-shaped members are approximately aligned on an axis generally perpendicular to both said base and said platform, said spring having one end attached to the first generally U-shaped member proximate the center point thereof and having the other end attached to the second generally U-shaped member proximate the center point thereof.

6. An improved bed having a head end and foot end comprising a generally rectangular base with an upperside, underside, head end and foot end, a generally rectangular top platform with an upperside, underside, head end and foot end, said base and said platform being attached near the corresponding head and foot ends therof by a suspension system having a first generally U-shaped member, a second generally U-shaped member, a first bearing holder having a first bearing near the top thereof which rotates around an axis generally directed from the head end of the bed to the foot end of the bed, a second bearing holder having a second bearing near the top thereof which rotates around an axis generally directed from the head end of the bed to the foot end of the bed, a suspension rod, a first suspension spring and a second suspension spring, said first generally U-shaped member having the ends thereof fixedly attached to the underside of the platform near an end corner thereof with such ends of such first generally U-shaped member being generally aligned in the direction from the head end of the bed to the foot end of the bed, said second generally U-shaped member having the ends thereof fixedly attached to the underside of the platform near the other corresponding end corner thereof with such ends of such second generally U-shaped member being generally aligned in the direction from the head end of the bed to the foot end of the bed, said first bearing holder being fixedly attached to the upperside of the base near the end corner thereof opposite the platform end corner of attachment of the first generally U-shped member, said second bearing holder being fixedly attached to the upperside of the base near the corner thereof opposite the platform end corner of attachment of the second generally U-shaped member, said suspension rod having one end section thereof mounted movably on the first bearing of the first bearing holder in the direction of rotation of such first bearing and the other end section thereof mounted movably on the second bearing of the second bearing holder in the direction of rotation of such second bearing, said rod passing through the open space defined by the first generally U-shaped member and through the open space defined by the second generally U-shaped member, said first suspension spring having one end attached to the first generally U-shaped member proximate the center point thereof and having the other end attached to the suspension rod at a point approximately directly above such center point, and said second suspension spring having one end attached to the second generally U-shaped member proximate the center point thereof and having the other end attached to the suspension rod at a point approximately directly above such center point.

7. The invention of claim 5 further comprising a first stabilizer spring and a second stabilizer spring, said first stabilizer spring having one end attached to the upperside of the base proximate the center section thereof and having the other end attached to the underside of the platform proximate the central head end section thereof, said second stabilizer spring having one end attached to the upperside of the base proximate the center section thereof and having the other end attached to the underside of the platform proximate the central foot end setion thereof.

8. The invention of claim 6 further comprising a first stabilizer spring and a second stabilizer spring, said first stabilizer spring having one end attached to the upperside of the base proximate the center section thereof and having the other end attached to the underside of the platform proximate the central head end section thereof, said second stabilizer spring having one end attached to the upperside of the base proximate the center section thereof and having the other end attached to the underside of the platform proximate the central foot end section thereof.

9. The invention of claim 5 wherein the suspension springs of the suspension system at the foot end of the bed are replaced with links of chain.

10. The invention of claim 6 wherein the suspension springs of the suspension system at the foot end of the bed are replaced with links of chain.

11. The invention of claim 5 wherein the suspension springs of the suspension systems at the foot end of the bed are replaced with rod segments.

12. The invention of claim 6 wherein the suspension springs of the suspension system at the foot end of the bed are replaced with rod segments.

* * * * *